United States Patent [19]

Charbonnel et al.

[11] Patent Number: 5,150,211

[45] Date of Patent: Sep. 22, 1992

[54] METHOD AND SYSTEM FOR MULTIPLEXING AUDIO AND VIDEO SIGNALS TO DISTRIBUTE STILL PICTURES WITH ACCOMPANYING SOUND

[75] Inventors: Pierre Charbonnel, Betton; Bernard Thepaut, Pace, both of France

[73] Assignees: L'Etat Francais represente par le Ministre des P.T.T. (Centre National d'Etudes des Telecommunications-CNET), Issy-Les-Moulineaux; Telediffusion de France, Paris, both of France

[21] Appl. No.: 573,409

[22] Filed: Aug. 28, 1990

[30] Foreign Application Priority Data

Sep. 5, 1989 [FR] France ............... 89 11591

[51] Int. Cl.$^5$ ............................................... H04N 7/08
[52] U.S. Cl. .................................. 358/143; 358/142
[58] Field of Search ................................ 358/142, 143

[56] References Cited

U.S. PATENT DOCUMENTS

| | | | |
|---|---|---|---|
| 3,953,881 | 4/1976 | Yanagimachi | 358/4 |
| 3,988,528 | 10/1976 | Yanagimachi et al. | 358/143 |
| 4,028,733 | 6/1977 | Ulicki | 358/86 |
| 4,295,154 | 10/1981 | Hata et al. | 358/4 |
| 4,488,182 | 12/1984 | Takahashi | 358/310 |
| 4,602,295 | 7/1986 | Moriyama et al. | 358/343 |
| 4,647,985 | 3/1987 | Yokosawa | 358/341 |
| 4,689,661 | 8/1987 | Barbieri et al. | 358/142 |
| 4,816,928 | 1/1989 | Sasaki | 358/343 |
| 4,825,303 | 4/1989 | Yablonski et al. | 358/143 |

FOREIGN PATENT DOCUMENTS 0052982  5/1981  Japan ............... 352/143

OTHER PUBLICATIONS

Patent Abstracts of Japan, vol. 7, No. 255 (E-210) (1400) Nov. 12, 1983 & JP-A-58 139580 (Nippon Denshin), Aug. 18, 1983.

Patent Abstracts of Japan, vol. 10, No. 48 (P-431) Feb. 25, 1986, & JP-A-60 191469 (Ricoh), Sep. 28, 1985.

Patent Abstracts of Japan, vol. 8, No. 194 (E-264) (1631) Sep. 6, 1984, & JP-A-59 83484 (Matsushita), May 14, 1984.

IEEE Transactions on Consumer Electronics, vol. CE-30, No. 3, Aug. 84, New York, pp. 230-235, Moriyama: "An Optical Video Disc System for Retrieving Digital Data and Reproducing Still Picture with Sound".

Primary Examiner—James J. Groody
Assistant Examiner—Minsun Oh
Attorney, Agent, or Firm—Wegner, Cantor, Mueller & Player

[57] ABSTRACT

An audio signal is multiplexed into a video picture signal by converting the audio signal into a sequence of digital code words from which subwords are extracted relative to a video signal line frequency. The number of bits in each subword is determined as a function of the amplitude dynamic range of the video signal, and each extracted digital subword is converted to provide analog samples with amplitudes proportional to quantizing of the corresponding digital subword. These analog samples are used to amplitude modulate an active portion of the video signal corresponding to a picture so as to provide a "composite" signal having the format of the video signal.

7 Claims, 2 Drawing Sheets

METHOD AND SYSTEM FOR MULTIPLEXING AUDIO AND VIDEO SIGNALS TO DISTRIBUTE STILL PICTURES WITH ACCOMPANYING SOUND

The field of the invention is that of methods of multiplexing a sound sequence signal within an analog video picture signal.

More particularly, the method relates to a new method of multiplexing a sound sequence signal which is sampled and multiplexed by pulse amplitude modulation in the active lines of the video picture signal.

This novel method constitutes a signal transmission technique which is compatible with existing equipment and it takes account of the specific characteristics of existing transmission media.

BACKGROUND OF THE INVENTION

Known methods of multiplexing a sound sequence signal with an analog video picture signal make use of techniques for digitizing audio samples and for time-division multiplexing signals in logic states which correspond to digital quantization of each audio sample with the analog video picture signal over the active lines of the video signal (code and pulse modulation).

However, these known encoding techniques limit the transport capacities of the analog video picture signal by the duration of the sound sequences inserted in each active line of the picture signal, with these limitations being due essentially to the method of encoding the audio samples.

Consequently, the object of the invention is to mitigate this drawback and in particular to significantly increase the duration of sound sequences inserted in each active line of the analog video picture signal by optimizing utilization of the amplitude dynamic range of the video picture signal for encoding the audio samples, with said duration being about 8 seconds of telephone quality sound per picture field on a channel for transmitting an analog video picture signal having a base bandwidth of 5 MHz and a dynamic range of less than 50 dB.

SUMMARY OF THE INVENTION

This object is achieved by means of a method of multiplexing an analog audio signal in an analog picture signal having an amplitude dynamic range, with the audio signal being multiplexed in an active portion of the video signal corresponding to a video picture, the method comprising the following steps:

the audio signal is digitized and data rate compression techniques are used to obtain a sequence of digital code words;

the sequence of digital code words is stored temporarily in order to extract code subwords sequentially at a frequency related to the line frequency of the video signal, each digital code subword comprising a number of bits which is predetermined as a function of the amplitude dynamic range of the video signal;

each extracted digital code subword is converted into analog form to provide analog samples having amplitude levels that are proportional to the quantizing of the corresponding digital code subwords; and the active portion of the video signal is subjected to amplitude modulation by the analog samples to provide a "composite" signal having the same format as a video signal.

In this way, if the period of the pulse amplitude modulated audio samples in the video signal is 160 nanoseconds, which is compatible with the characteristics of existing video channels, it is possible to encode 8 seconds of sound (at 32 kilobits/second per video field; standard G 721) or 4 seconds of sound (at 64 kilobits/second per video field; standard G 711), where one field of a video picture signal occupies 1/50 of a second in "Pal-Secam" mode.

Each digital code subword preferably comprises four bits.

The number of bits in a digital code word is preferably a multiple of four, and the step of extracting digital code subwords includes a step of segmenting digital code words into digital code subwords and of ordering the digital code subwords.

In this way, although limited by the amplitude dynamic range of the video picture signal, it is possible to increase the resolution of the digital samples representing the sound sequence signal. In addition, it is always possible to keep a safety margin relative to noise.

The invention also relates to an interactive system for distributing still pictures accompanied by sound by using the encoding method of the invention, in which the same video transmission channel is used for simultaneously transmitting both still picture information and audio signal information for sound sequences associated with still pictures.

Interactive systems already exist for distributing pictures accompanied by sound. However, a major drawback of these prior systems lies in the fact that pictures and sound are conveyed by separate channels. In addition, these prior systems are not compatible with broadcast mode.

Consequently, another object of the invention is to provide an interactive system for distributing still pictures accompanied by sound by using a single video transmission channel, the system being capable of enabling 25 still pictures to be consulted simultaneously per second, with each still picture being accompanied by at least 8 seconds of sound (telephone quality; CCITT standard G 721).

This object is achieved by means of an interactive system for distributing still pictures accompanied by sound with the still pictures accompanied by sound sequences being transmitted over a video communication network to a plurality of reception terminals, the system comprising:

first memory for storing a plurality of sets of digitized pixels;

second memory means for storing a plurality of code word sequences representing a digitized sound sequence signal, each picture being associated with a sound sequence;

extractor means connected to said first and second memory means to extract alternately a set of pixels of a digitized picture corresponding to a picture field and a sequence of code words corresponding to a sound sequence of predetermined duration;

digital-to-analog converter means connected to said storage means for converting the set of pixels and the sequence of code words alternately into analog form; and video encoding means connected to the digital-to-analog converter means providing a "composite" analog video picture signal alternately comprising a pixel field and a code word field.

The reception terminal preferably comprises:

analog-to-digital converter means for digitally converting the analog video picture signal into pixel components;

switching means connected to the analog-to-digital converter means and controlled by a field signal for separating a set of digitized pixels in a picture field from a sequence of code words representing an associated digitized sound sequence multiplexed in an adjacent picture field;

memory means connected to the switching means and responsive to control by the field signal to store alternately the set of pixels and the sequence of code words; and digital-to-analog converter means connected to the storage means to deliver an analog audio signal on the basis of the sequence of code words.

BRIEF DESCRIPTION OF THE DRAWINGS

An embodiment of the invention is described by way of example with reference to the accompanying drawings, in which.

DETAILED DESCRIPTION

Figure 1:
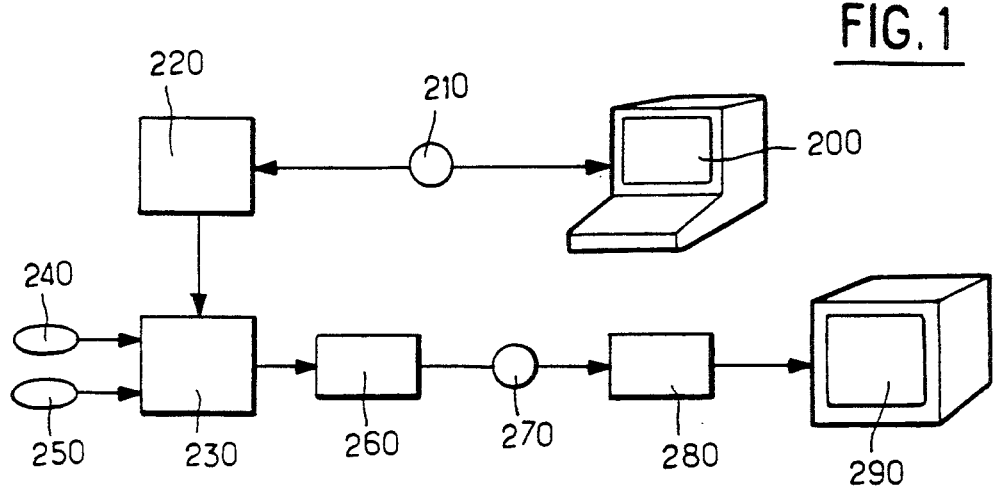
FIG. 1 is a block diagram of an interactive system for distributing still pictures accompanied by sound.

As can be seen in FIG. 1, the interactive system for distributing still pictures accompanied by sound includes a server site constituted firstly by an on-line server 220 connected by the public switched telephone network (PSTN) 210 to a plurality of on-line terminals 200, and secondly by an audiovideo server 230 connected by a video communication network (e.g. the wideband network 270) to a plurality of terminals 280, display sets 290 for video reception of pictures accompanied by sound, each of the terminals 280 being with an on-line terminal 200.

The audiovideo server 230 is also connected both to storage means 240 for storing a data base of still pictures recorded in digital form (e.g. in the form of pixels each encoded in color components on 12 bits, using 4 bits for the red component (R), 4 bits for the green component (G), and 4 bits for the blue component (B), or else encoded in the form of luminance (Y) and chrominance (DR,DB) components, likewise on 12 bits with 7 bits for the luminance component (Y) and 5 bits for the chrominance component (DR/DB)), and to storage means 250 for storing a data base of sound sequences also recorded in digital form (e.g. in the form of digital samples of an audio signal as sampled and encoded on 4 bits, corresponding to telephone quality sound).

Each still picture in the picture data base is associated with a sound sequence in the sound sequence data base, which sequence constitutes a commentary on the still picture. Since the picture is still, only one field is per picture transmitted over the video communication channel by means of a "Pal-Secam" encoder 260 connected to the audiovideo server, with a second field being used for insertion of the associated sound sequence by multiplexing.

A user consults a still picture accompanied by sound as follows. The user communicates with the on-line server 220 by means of the on-line terminal 200, and provides a personal identification code together with the number of the still picture to be displayed on the video display set 290.

The audiovideo server 230 has a memory area for still pictures accompanied by sound which is fed from the storage means of the data bases 240 and 250, and this memory area for still pictures accompanied by sound is permanently updated as a function of information that the audiovideo server receives from the on-line server. In addition, each still picture loaded into the memory area contains the identity in encoded form of the user wishing to consult that picture.

The audiovideo server then distributes the still pictures accompanied by sound by reading the memory area cyclically. For each still picture accompanied by sound, the transmitted video image signal comprises in encoded manner both a picture field relating to picture information and a "pseudo-picture" field relating to sound sequence information multiplexed in the video signal. This "composite" video signal is received by a terminal 280 connected to the picture display set 290, with the terminal decoding the picture information contained in one picture field and the multiplexed sound information contained in an adjacent picture field. The still picture is identified at the terminal 280 by recognizing the user code, and it is displayed on the picture display set 290, while the decoded sound information is delivered to the user as a commentary on the displayed still picture.

Figure 2:
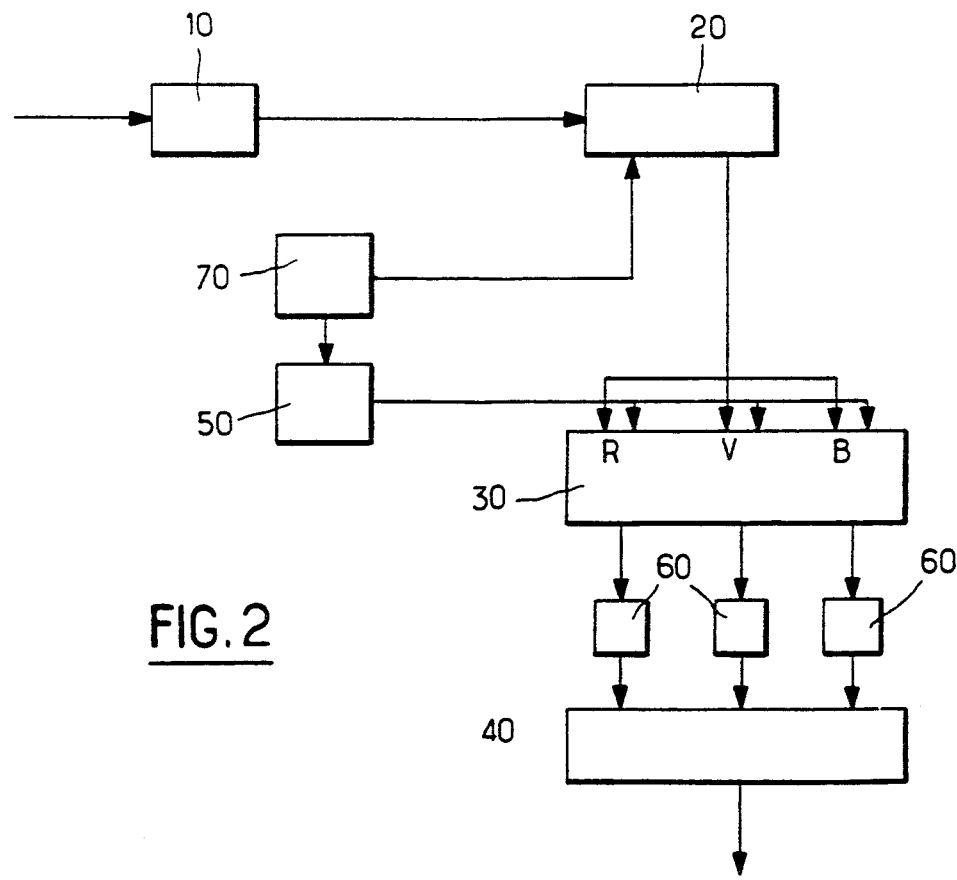
FIG. 2 is a block diagram of a circuit for multiplying sound sequences in an analog video signal in accordance with the invention, and in which the sound sequence signal is digitized on four bits.
Figure 3:
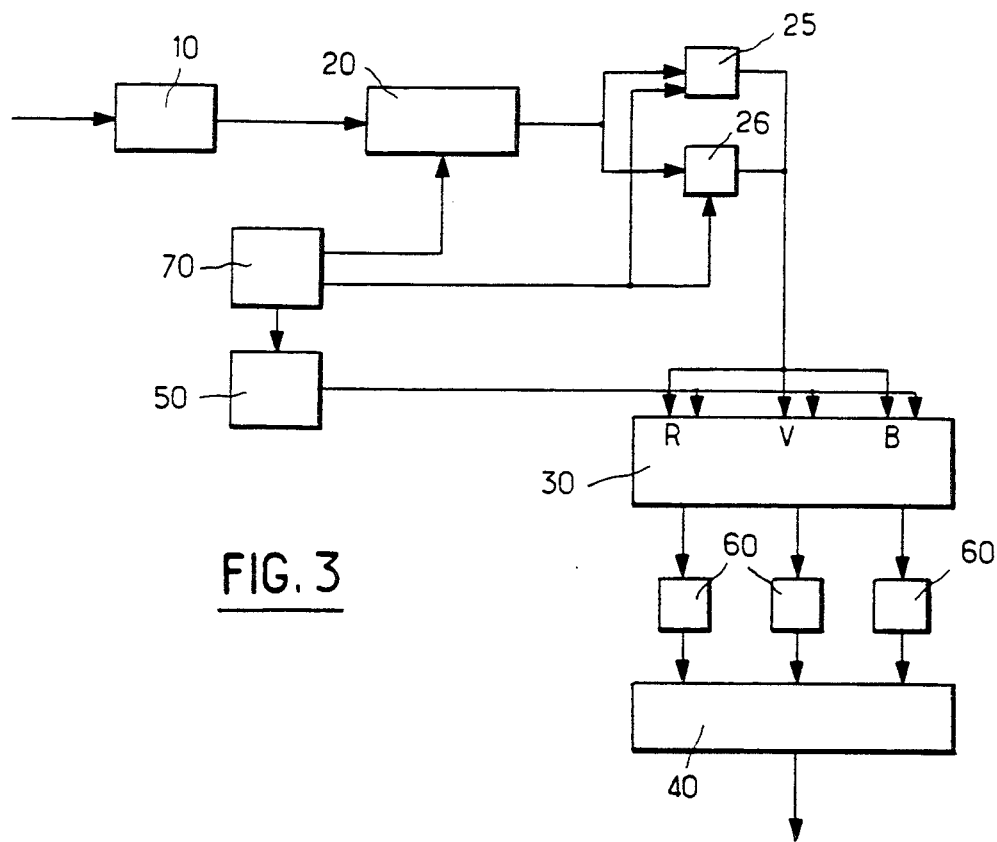
FIG. 3 is a block diagram of a sound sequence multiplexing circuit corresponding to that of FIG. 2, but in which the sound sequence signal is digitized on 8 bits.

With reference to FIGS. 2 and 3, there follows a description of the method whereby the audio signal is multiplexed in the analog video signal which is transmitted by the audiovideo server 230.

As can be seen in FIG. 2, the sound sequence signal is applied to the input of an analog-to-digital converter 10 to be sampled at a sampling frequency of 8 kHz, for example.

The amplitude level of each audio sample may be encoded in conventional manner on 12 bits, thereby defining a given level of resolution.

An analog video picture signal is built up from a succession of picture lines each having an active duration of 52 microseconds. The amplitude dynamic range of an analog video signal is about 50 dB. Taking account of this dynamic range and the quantizing law used, sixteen different amplitude levels can be distinguished in that portion of the signal which corresponds to an active line of a video picture, while still providing an adequate safety margin relative to noise. The safety margin obtained in this way is 24 dB. Consequently, the amplitude level of a modulated pulse in an active line of the analog video picture signal is capable of corresponding to a quantization value expressed on four bits.

Data rate compression is obtained in the process of analog-to-digital conversion of the sound sequence signal, either by using a logarithmic algorithm, or else by using an algorithm of the adaptive differential pulse code modulation (ADPCM) type, thereby obtaining a sequence of code words at the output from the converter 10, each comprising four bits and representing the audio samples.

The sequence of code words is then stored in a buffer store or temporary memory 20 of sufficient capacity to ensure continuity of the sound sequence.

The temporary memory 20 thus contains a sequence of code words each expressed on four bits. The code words are extracted sequentially from the temporary memory 20 in the same order as that in which they were stored, with the words being extracted at a frequency equal to the line frequency of the analog video signal, or to a submultiple thereof, and being applied to a digital-to-analog converter 60 having 4-bit resolution and operating at a conversion frequency of not less than 12 MHz.

The digital-to-analog converter 60 may be of the AD97 02 type sold by Analog Devices. The digital-to-analog converter 60 delivers analog pulses or samples of amplitude proportional to the quantization of the code words. The analog samples take the place of video picture color components (color pixels) for the purpose of being multiplexed in the analog video picture signal by a sequential encoder of the Pal-Secam-NTSC type or the like for distribution over a video transmission channel.

The sound sequences are preferably multiplexed in the analog video signal on every other picture field, with the second field being reserved for encoding the pixels of a still picture to be distributed as described above.

A multiplexer 30 is coupled between the temporary memory 20 and the digital-to-analog converter 60. The input of the multiplexer 30 is connected to a memory 50 for storing digital pixels that correspond either to RGB color components or else to luminance and chrominance components encoded on 12 bits. The multiplexer 30 is synchronized on the video picture field frequency and feeds the converters 60 with sound samples or with pixels in alternate picture fields. It can be seen that it is advantageous for the capacity of the temporary memory 20 to correspond to storing a sequence of code words suitable for insertion into one video picture field. This field memory may be made of random access memory (RAM) components of the type N43 256 C as manufactured by NEC.

In the system for distributing still pictures accompanied by sound, the code words relating to the sound sequence signal are initially stored in the storage means 230 and consequently the sound sequence signal is not digitized in real time. Thus, the temporary memory 20 may have a capacity of 128K 4-bit words, thereby enabling 25 pictures to be distributed per second, each of them being accompanied by 8 seconds of telephone-quality sound sequence.

A time base 70 constituting extraction means is advantageously provided, connected to the temporary memory 20 for code words and to the pixel memory 50, and serving to select one or other of the memories in alternation as a function of a field synchronization signal.

At the output from the analog-to-digital converter 10, the sound sequence signal may be digitized in the form of a sequence of code words each comprising 8 bits, by using a compression and digitizing method of the logarithmic A law type for reducing binary data rate and in accordance with CCITT standard G711. Code words of this type cannot be multiplexed directly in pulse form in the video picture signal, given the limited dynamic range thereof. As described above, the code words obtained in this way are stored in the temporary memory 20 in the form of 8-bit bytes. At the output from the temporary memory 20, each code word is segmented into two subwords each comprising 4 bits and corresponding respectively to the more significant bits and to the less significant bits of the code word. This segmentation may be obtained, for example, by using two shift registers 25 and 26 which are fed from the temporary memory 20. These shift registers 25 and 26 operate to provide the multiplexer 30 successively with a first code subword delivered by the register 25 and corresponding, for example, to the more significant bits of the code word, and then with a second code subword delivered by the register 26 and corresponding to the less significant bits of the code word, with each of the code subwords comprising 4 bits. In this case, the shift registers operate at a frequency equal to one-half of line frequency.

Each of the code subwords obtained in this way is delivered as before to the digital-to-analog converter 60 for multiplexing in the video picture signal. The same process may advantageously be applied to multiplexing code words in a video picture signal where the code words derived from digitizing an audio signal are more than 8 bits long.

In this way, each 8-bit code word is made to correspond to a pair of analog samples of the pulse signal type as delivered by the digital-to-analog converter 60, thus giving a total number of amplitude levels corresponding to quantization of the code word.

Advantageously, the number of bits in a code word is a multiple of four in order to facilitate processing during segmentation.

The analog video picture signal provided by the encoder 40 comprises a succession of fields corresponding alternately to a picture field and to a pseudo-picture field, with the pseudo-picture field containing the multiplexed audio samples.

This "composite" analog video picture signal is received by a terminal 280 connected to the video picture reception and display set 290 as shown in FIG. 1. The function of the terminal 280 is to restore picture information occupying a first field and sound information multiplexed in an adjacent, second field.

Figure 4:
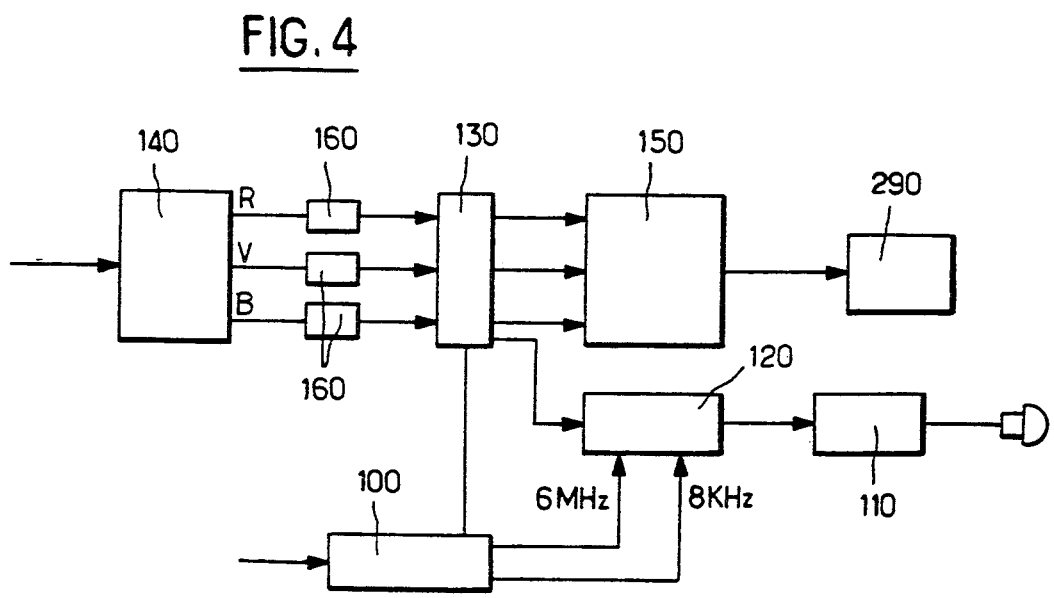
FIG. 4 is a block diagram of a terminal for decoding an audio signal multiplexed in the video channel by means of the invention.

The "composite" video picture signal received at the input of the terminal 280 is decoded into RGB color components by a "Pal-Secam" decoder 140, for example, as shown in FIG. 4.

The RGB signals are digitized by analog-to-digital converters 160 which deliver a sequence of 4-bit binary words. The sequence of binary words is segmented into two fields of binary word sequences, one corresponding to a picture field and the other corresponding to a pseudo-picture field, with segmentation being controlled by a 74 157 type multiplexer 130 as manufactured by Texas Instruments and serving as switching means. The multiplexer 130 is fed with an odd/even field signal supplied by a time base 100 of the video synchronization extractor type, e.g. an LM 1881 manufactured by N.S. The digital data switched by the multiplexer 130 is stored either in a picture field memory 150 if the data comprises picture information, or else in a sound field memory 120 for data comprising code words relating to a sound sequence. The picture field memory 150 is preferably a 256K byte memory and the sound field memory is preferably a memory having a capacity of 128K 4-bit words.

The time base 100 connected to the sound field memory 120 enables code words to be written in the memory 120 at a frequency of 6 MHz, i.e. half the pixel frequency, thereby giving a sample period of 160 nanoseconds, and it enables the code words contained in the sound field memory 120 to be read at a sound sampling frequency of 8 kHz, with the samples being delivered to a decoder 110.

When transmitting sound samples corresponding to 8-bit code words, the 4-bit code subwords delivered by the analog-to-digital converter 60 are located sequentially in the sound field memory with the 8-bit bytes corresponding to the code words being put into serial form for application to a type TCR 2913 sound encoder-decoder 110 including its own filtering and as manufactured by Texas Instruments, which converts the code words into analog form and delivers a corresponding analog audio signal.

An advantage of using field memories 150 and 120 is that it is possible to "freeze" the contents of a picture, i.e. both the picture field and the sound field, and then repeat the sound sequence as often as necessary.

As mentioned above, the analog sample period is 160 nanoseconds. Such a period is equivalent to writing each digital code subword in two digital pixels of a video picture.

Thus, in the storage means 230 each digital code subword is duplicated in two memory words corresponding to two video picture pixels so as to avoid being constrained by the performance of the circuit for reconstituting the audio signal.

Naturally, each digital code subword may be written into more than two memory words. However this reduces the transmission capacity of the video channel.

A particular problem with the multiplexing method of the invention lies in the fact that the degree of correlation in the video signal is increased because of the large variations in the amplitude levels of successive analog samples. In order to remain compatible with a Secam type video encoder system, the passband of the luminance signal must be about 2.5 MHz. In order to remain within the luminance signal passband, interpolation is performed between adjacent digital code subwords. The interpolation consists in replacing the value of one of the digital code subwords written in a pixel pair by a mean amplitude level value corresponding to the mean of the amplitude levels of two adjacent digital code subwords. This operation is equivalent to performing digital filtering to attenuate frequency spectrum aliasing that gives rise to interference between the analog audio samples in the video signals. This improvement may be further improved by performing interpolation twice over when each code subword is written into three pixels, thereby further improving the quality of audio signal restitution.

Naturally, the invention is not limited to the example described above and other variants could advantageously be provided without going beyond the scope of the invention.

We claim:

1. A method of multiplexing an analog audio signal in an analog video signal having an amplitude dynamic range, with the audio signal being multiplexed in an active portion of the video signal corresponding to a video picture, the method comprising the steps of:
   digitizing and utilizing data rate compression techniques of said audio signal in order to obtain a sequence of digital code words;
   storing temporarily said sequence of digital code words in a buffer;
   extracting digital code subwords sequentially from said buffer at a frequency related to a line frequency of said video signal, each said subword comprising a number of bits which is predetermined as a function of said amplitude dynamic range of said video signal;
   converting each of said subwords which are extracted into analog form so as to provide analog samples having amplitude levels proportional to quantizing of corresponding digital code subwords; and
   subjecting said active portion of said video signal to amplitude modulation by said analog samples so as to provide a composite signal having a same format as said video signal.

2. A method as in claim 1, wherein said digital code subword consists of four bits.

3. A method as in claim 2, wherein said digital code word comprises a multiple of four bits, and said extracting further comprises the steps of:
   segmenting said digital code words into digital code subwords; and
   arranging said subwords in a particular order.

4. A method as in claim 1, and further comprising the steps of:
   writing each said subword into at least two digital video pixels.

5. A method as in claim 4, and further comprising the step of:
   associating each said subword with at least one interpolated digital code subword.

6. An interactive system for distributing still pictures accompanied by sound, with the still pictures accompanied by sound sequences being transmitted over a video communication network to a plurality of reception terminals, the system comprising:
   first memory means for storing a plurality of sets of digitized pixels;
   second memory means for storing a plurality of code word sequences representing a digitized sound sequence signal, each picture being associated with a sound sequence;
   extractor means, connected to said first and second memory means, for extracting alternately a set of pixels of a digitized picture corresponding to a picture field and a sequence of code words corresponding to a sound sequence of predetermined duration;
   digital-to-analog converter means, operatively associated with said extractor means, for converting the set of pixels and the sequence of code words alternately into analog form; and
   video encoding means, connected to the digital-to-analog converter means, for providing a "composite" analog video picture signal alternately comprising a pixel field and a code word field.

7. A system according to claim 6, in which a reception terminal comprises:
   analog-to-digital converter means for digitally converting the analog video picture signal into pixel components;
   segmenting means, connected to the analog-to-digital converter means and controlled by a field signal, for separating a set of digitized pixels in a picture field from a sequence of code words representing an associated digitized sound sequence multiplexed in an adjacent picture field;
   memory means, connected to the switching means and responsive to control by the field signal, for storing alternately the set of pixels and the sequence of code words; and
   digital-to-analog converter means, connected to the storage means, for delivering an analog audio signal on the basis of the sequence of code words.

* * * * *